(12) United States Patent
Zidar

(10) Patent No.: US 9,074,627 B2
(45) Date of Patent: *Jul. 7, 2015

(54) ANTI-FRICTION COATING

(75) Inventor: Jakob Zidar, Altmuenster (AT)

(73) Assignee: Miba Gleitlager GmbH, Laakirchen (AT)

( * ) Notice: Subject to any disclaimer, the term of this patent is extended or adjusted under 35 U.S.C. 154(b) by 825 days.

This patent is subject to a terminal disclaimer.

(21) Appl. No.: 12/928,358

(22) Filed: Dec. 9, 2010

(65) Prior Publication Data

US 2011/0142381 A1  Jun. 16, 2011

(30) Foreign Application Priority Data

Dec. 10, 2009 (AT) ................................. A 1958/2009

(51) Int. Cl.
*F16C 33/00* (2006.01)
*B32B 15/00* (2006.01)
(Continued)

(52) U.S. Cl.
CPC ................. *F16C 33/12* (2013.01); *B32B 15/01* (2013.01); *C22C 13/02* (2013.01); *F16C 2204/34* (2013.01)

(58) Field of Classification Search
CPC ....................................................... B32B 15/01
USPC ......................................................... 428/646
See application file for complete search history.

(56) References Cited

U.S. PATENT DOCUMENTS 3,827,884 A   8/1974  Morisaki
4,079,720 A   3/1978  Takahashi
(Continued)

FOREIGN PATENT DOCUMENTS

CN   1340108 A    3/2002
CN   101046228 A  10/2007
(Continued)

OTHER PUBLICATIONS

English Translation of DE10145389, EPO.*
(Continued)

*Primary Examiner* — Humera Sheikh
*Assistant Examiner* — Lucas Wang
(74) *Attorney, Agent, or Firm* — Collard & Roe, P.C.

(57) ABSTRACT

The invention relates to an anti-friction coating (4) for a multi-layered friction bearing (1) made from a tin-based alloy which, in addition to tin, contains at least one element from the group comprising antimony and copper as the main alloying element, optionally lead and/or bismuth, and unavoidable impurities originating from the elements during the manufacturing process, and the proportion of antimony is at most 20% by weight, the proportion of copper is at most 10% by weight and the total proportion of lead and bismuth is at most 1.5% by weight and the total proportion of copper and antimony is between 2% by weight and 22% by weight, and tin is present in the form of inter-metallic phases and as a tin phase with beta-tin grains, and the beta-tin grains in the tin-based alloy have at least one preferred orientation, and an orientation index M{hkl} based on the formula $$M\{hkl\} = \frac{I\{hkl\} \sum I^0\{hkl\}}{I^0\{hkl\} \sum I\{hkl\}}$$

Figure 1:
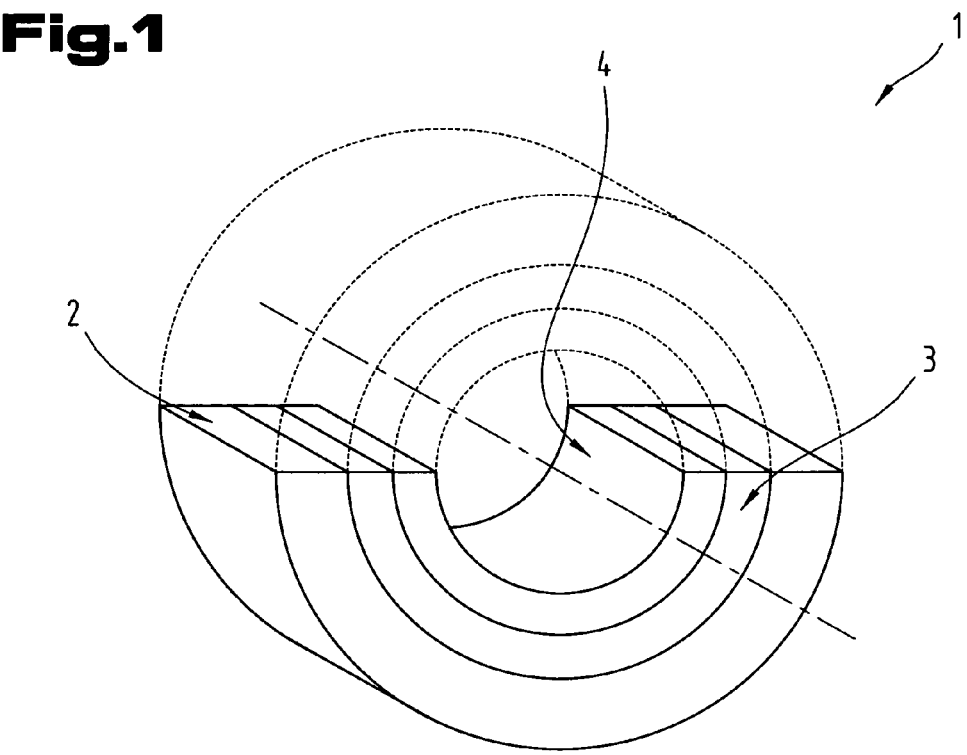

of at least one set of network levels M{hkl} has or exceeds the value 3.0, and I{hki} stands for the X-ray diffraction intensities for the {hkl} planes of the anti-friction coating and $I^0\{hkl\}$ stands for the X-ray diffraction intensities of the totally non-oriented tin powder sample.

9 Claims, 4 Drawing Sheets

(51) Int. Cl.
*C22C 13/00* (2006.01)
*F16C 33/12* (2006.01)
*B32B 15/01* (2006.01)
*C22C 13/02* (2006.01)

(56) References Cited

U.S. PATENT DOCUMENTS

| | | | |
|---|---|---|---|
| 5,433,531 A * | 7/1995 | Thompson | 384/276 |
| 5,641,454 A | 6/1997 | Kito et al. | |
| 6,492,039 B2 | 12/2002 | Huhn et al. | |
| 6,575,635 B1 | 6/2003 | Tsuji et al. | |
| 6,589,372 B1 | 7/2003 | Roeingh et al. | |
| 2002/0031684 A1 | 3/2002 | Niegel et al. | |
| 2004/0076541 A1 * | 4/2004 | Laughlin et al. | 420/561 |
| 2004/0264820 A1 | 12/2004 | Tsuji et al. | |
| 2005/0029675 A1 | 2/2005 | Hua | |
| 2006/0193744 A1 | 8/2006 | Yang | |
| 2006/0216475 A1 * | 9/2006 | Miyazawa et al. | 428/141 |
| 2007/0269147 A1 | 11/2007 | Rumpf | |
| 2008/0102307 A1 * | 5/2008 | Zidar | 428/640 |
| 2008/0152942 A1 | 6/2008 | Zidar et al. | |
| 2010/0119868 A1 | 5/2010 | Nomura et al. | |

FOREIGN PATENT DOCUMENTS

| | | | | |
|---|---|---|---|---|
| CN | 101201079 A | | 6/2008 | |
| DE | 82 06 353 | | 5/1983 | |
| DE | 82 06 353 U1 | | 5/1983 | |
| DE | 197 28 777 | | 4/1999 | |
| DE | 197 28 777 A1 | | 4/1999 | |
| DE | 199 63 385 C1 | | 1/2001 | |
| DE | 100 54 461 | | 5/2001 | |
| DE | 10145389 | * | 4/2003 | C22C 13/00 |
| DE | 10 2004 030 017 B4 | | 7/2006 | |
| DE | 20 2007 018 614 U1 | | 12/2008 | |
| DE | 10 2007 030 017 | | 1/2009 | |
| DE | 20 2007 018 616 | | 1/2009 | |
| GB | 2 260 338 A | | 4/1993 | |
| GB | 2 285 059 A | | 6/1995 | |
| GB | 2321468 A | | 7/1998 | |
| GB | 2 375 801 | | 11/2002 | |
| JP | 10205539 A | | 8/1998 | |
| JP | 10-330871 A | | 12/1998 | |
| JP | 2001089894 A | | 4/2001 | |
| WO | WO 2006/028668 A1 | | 3/2006 | |
| WO | 2008133316 A2 | | 11/2008 | |

OTHER PUBLICATIONS

European Search Report in EP 10 19 4019 dated Apr. 4, 2011, with English translation of relevant parts.
Austrian Search Report in A 1957/2009 dated May 31, 2010, with English translation of relevant parts.
Chinese Search Report in CN 201010625191.2 received Mar. 28, 2014.
Wikipedia, http://en.wikipedia.org/wiki/Miller_index, Miller indices, downloaded Jun. 23, 2014 (6 pages).
German Wikipedia http://de.wikipedia.org/wiki/Millersche_Indizes, downloaded Jun. 23, 2014 (3 pages).

* cited by examiner

ANTI-FRICTION COATING

CROSS REFERENCE TO RELATED APPLICATIONS

Applicant claims priority under 35 U.S.C. §119 of Austrian Application No. A 1958/2009 filed on Dec. 10, 2009, the disclosure of which is incorporated by reference.

The invention relates to an anti-friction coating for a multi-layered friction bearing made from an alloy with a base of tin which, in addition to tin, contains at least one element from the group comprising antimony and copper as the main alloying element, optionally lead and/or bismuth, and unavoidable impurities originating from the elements during the manufacturing process, and the proportion of antimony is at most 20% by weight, the proportion of copper is at most 10% by weight, the total proportion of lead and bismuth is at most 1.5% by weight, the total proportion of copper and antimony is between 2% by weight and 22% by weight, and tin is present bonded in the form of inter-metallic phases and freely in the form of a tin phase with beta-tin grains, a multi-layered friction bearing comprising at least one metal base layer, an anti-friction coating and optionally a bearing metal layer disposed between the anti-friction coating and the metal base layer.

The use of tin-based alloys for anti-friction coatings of multi-layered friction bearings is already known from the prior art.

For example, document DE 82 06 353 U1 describes an anti-friction bearing shell comprising a steel base shell, a bearing layer, optionally one or more binding and/or blocking layers, as well as a galvanically deposited anti-friction coating made from a white metal bearing alloy on a base of tin containing at most 2% by weight Cu, 2 to 18% by weight Sb, 0 to at most 0.6% by weight As, 0 to at most 0.5% by weight Ni and 0 to at most 1.5% by weight Cd.

Document DE 20 2007 018 616 U1 describes an anti-friction element which also has an anti-friction coating galvanically deposited on a base layer made from a tin-based alloy containing 5-20% by weight Sb, 0.5-25% by weight Cu and at most 0.7% by weight Pb. The total content of all the other elements is less than 0.5% by weight. The key feature in this instance is that the tin crystals are predominantly globular in shape.

In the case of the first of the documents mentioned above, DE 82 06 353 U1, a higher proportion of copper represents a disadvantage in terms of the tribological properties of the anti-friction coating, but the teaching disclosed in this document, DE 20 2007 018 616 U1, is explicitly the opposite of this.

To avoid having to reduce the proportion of copper in the anti-friction coating, document GB 2 375 801 A describes a multi-layered bearing with a double-layered anti-friction coating, and the outer partial layer is made from a tin-based alloy containing 0.5-10% by weight Cu and optionally up to 5% by weight Zn, In, Sb or Ag, and the second partial layer lying underneath is made from a tin-based alloy containing 5-20% by weight Cu.

Document DE 10 2004 030 017 B4 discloses an anti-friction coating containing a tin-based alloy for a so-called grooved bearing, and this tin-based alloy is incorporated in the grooves of the anti-friction coating and contains up to 20% by, weight Cu and optionally up to 10% by weight Ag and up to 15% by weight Sb.

Document DE 100 54 461 A1 also describes a multi-layered friction bearing with a three-layered anti-friction coating with a base of tin designed to increase resistance to corrosive wear. This tin-based alloy contains at least one metal from a group comprising Cu, Sb, Ag, In, Zn, Ni, Co and Fe in a proportion of up to 30% by weight. Hard particles in the form of nitrides or carbides may also be incorporated in a proportion of up to 25% by vol. The middle layer of the anti-friction coating contains a higher proportion of these additives than the top and bottom partial layers.

Document DE 197 28 777 discloses an anti-friction coating for a multi-layered friction bearing which, in addition to tin, contains between 3 and 20% by weight Cu and optionally up to 20% by weight Bi, Ag or Ni respectively.

In the past, lead coatings have also often been used as anti-friction layers because lead has significant advantages over tin. However, lead is problematic in that it is not environmentally friendly.

The objective of the invention is to propose an anti-friction coating which has a low lead content or is free of lead.

This objective is achieved on the basis of the anti-friction coating outlined above, in which the beta-tin grains in the tin-based alloy assume at least one preferred orientation and, independently of the above, by the multi-layered friction bearing outlined above which is provided with the anti-friction coating proposed by the invention.

To quantify the preferred orientation, the orientation index $M\{hkl\}$ is defined as follows:

$$M\{hkl\} = \frac{I\{hkl\} \sum I^0\{hkl\}}{I^0\{hkl\} \sum I\{hkl\}}$$

where $I\{hkl\}$ stands for the XRD intensities (X-ray diffraction intensities) of the $\{hkl\}$ planes of the anti-friction coating and $I^0\{hkl\}$ stands for the XRD intensities of the totally non-oriented tin powder sample (ICDD PDF 00-004-0673).

The diffraction intensities $\Sigma I\{hkl\}$ and $\Sigma I^0\{hkl\}$ must be summed across the same range, for example all the intensities of the reflexes from $\{200\}$ to $\{431\}$, which, when using CuKα radiation, corresponds to all reflexes with an angle of diffraction 2θ of between 30° and 90°.

A preferred orientation as proposed by the invention exists when the orientation index reaches or exceeds at least one set of network levels $M\{hkl\}$ 3.0.

With a view to producing anti-friction coatings with a low lead content or free of lead, the applicant has also conducted tests on tin-based alloys containing copper and/or antimony, amongst others, and has surprisingly found that some of these tin-based alloys exhibit significantly better tribological properties and/or a significantly higher fatigue strength than others.

By conducting tests on the structure of these tin-based alloys by means of X-ray diffractometry, it was ascertained from the diffraction patterns that the beta-tin crystallites in these tin-based alloys have a clear orientation of symmetry-related equivalent planes in one direction. Although this material is relatively soft as such and thus exhibits excellent properties in terms of ability to embed dirt particles, the tin-based alloys proposed by the invention also exhibited a better resistance to wear and/or a higher fatigue strength. It is assumed that the latter is due to the oriented tin crystallites, and pole measurements demonstrated that the texturing of the anti-friction coating is formed on the surface rotationally symmetrically with respect to the normal.

During the course of the XRD tests, it was also found that even slight changes at the surface, which nevertheless did not impair the resistance to wear or fatigue strength of the coating as a whole, caused a significant change in the diffractogram measured. However, the apparent change in the preferred orientation of the anti-friction coating is a factor induced by the short penetration depth of the X-rays. In order to determine the preferred orientation, a damaged surface zone has to be carefully removed, for example by ion etching, or even more preferably, its occurrence prevented altogether. Damage to the surface zone might occur due to mechanical processing after coating, wear during operation or due to the application of a running-in or anti-corrosion coating, for example.

The value of the orientation index M{hkl} of at least one set of network levels based on the Miller Index is at least 6.0, in particular at least 9.0.

Surprisingly, it was found that coatings proposed by the invention exhibited a better resistance to wear and increased fatigue strength even though they are otherwise no different or barely any different from coatings known from the prior art, for example in terms of composition, hardness or surface roughness.

This effect occurred in particular if the beta-tin grains were oriented in at least of the planes {hk1} based on the Miller Index, where h is greater than k by 1 in each case and h assumes a value of at most 4.

The advantage of this is that if the surface underneath the peak in the X-ray diffractogram, i.e. the intensity created by beta-tin grains oriented along {321} based on the Miller Index, is bigger by a factor of least 1.2 than the surface underneath the peak, i.e. the intensity created by the beta-tin tin grains oriented along {431}, the described effects can be further improved.

Surprisingly, however, this effect also occurred when this general rule specified above was not satisfied or was only partially satisfied, and instead the structure of the tin-based alloy contained beta-tin grains oriented to an extent of at least 30%, in particular 40%, preferably 50%, along {220} based on the Miller Index, expressed by the surface underneath the peak created by the beta-tin grains in this orientation, i.e. their intensity.

Within the scope of the invention, it is preferable if the proportion of antimony is between 5% by weight and 15% by weight and if the copper content is between 0.5% by weight and 5% by weight. On this basis, the anti-friction coatings produced also had a better resistance to abrasion in addition to good embedding properties.

In particular, the proportion of antimony may be between 7% by weight and 12% by weight and the copper content may be between 1% by weight and 3.75% by weight. Although the intention was to obtain lead-free anti-friction coatings in principle, it was found possible within the context of the invention to opt for a lead content of at most 0.1% by weight, in particular at most 0.05% by weight, which would still be permissible, and these embodiments of the invention may still be considered as lead-free within the meaning of the EU's End-of-Life Vehicles Directive (Directive 2000/53/EC "ELV Directive").

For some applications, however, it has proved to be of advantage if the tin-based alloys have a higher lead content and/or bismuth content, although in such situations, the lead content and/or bismuth content is limited to a value of between 0.2% by weight and 0.5% by weight, in particular to a value of between 0.2% by weight and 0.35% by weight. It is assumed that lead accumulates at the grain boundaries and increases their strength. Bismuth obviously fulfils the same function and may replace the lead in lead-free alloys.

An increase in the lead- and/or bismuth content beyond 1.5% by weight leads to a sharp decrease in the heat resistance of the alloy coating and does not therefore offer any advantages.

To improve resistance to abrasion still further, i.e. to impart greater hardness to the anti-friction coating, it is of advantage if the tin-based alloy contains at least one element from a group comprising zirconium, silicon, zinc, nickel and silver, added to the alloy in a proportion, in total, of at most 3% by weight. In this respect, the proportion of zirconium may also be at most 1.5% by weight and that of silicon at most 1.2%.

One embodiment offers an option whereby zirconium and silicon are not present as elements or as inter-metallic phases and instead, the tin-based alloy also contains oxygen and/or carbon, which means that there are hard particles of $ZrO_2$ and SiC dispersed through the tin-based alloy, which likewise enables the strength of the anti-friction coating to be improved.

In this respect, it is of advantage if these $ZrO_2$ and SiC particles have a mean diameter of between 0.01 μm and 1 μm, which results in a more fine-grained structure. It was observed that particle diameters in excess of 1 μm impaired the effect described above.

In the case of one embodiment of the multi-layered friction bearing, an intermediate coat is disposed between the bearing metal layer and the anti-friction coating, which comprises one or more partial coatings which are galvanically deposited or applied by diffusion, and each of the partial coatings or the intermediate coating itself contains one or more elements from the group comprising chromium, nickel, iron, cobalt, copper and tin. On this basis, it was possible to obtain better structural hardness of the multi-layered friction bearing, particularly as regards the relatively soft tin-based alloy of the anti-friction coating.

In this respect, it is of advantage if the intermediate coating has a hardness which is at least three times greater than the hardness of the anti-friction coating, and is also greater than the hardness of the base material to which the intermediate coating is applied, thereby resulting in better support for the anti-friction coating on the base so that the anti-friction coating has better tribological properties and is softer.

It is also of advantage if the hardness of the intermediate coating is at least five times greater than the hardness of the anti-friction coating.

To provide a clearer understanding, the invention will be explained in more detail with reference to the appended drawings.

Figure 2:
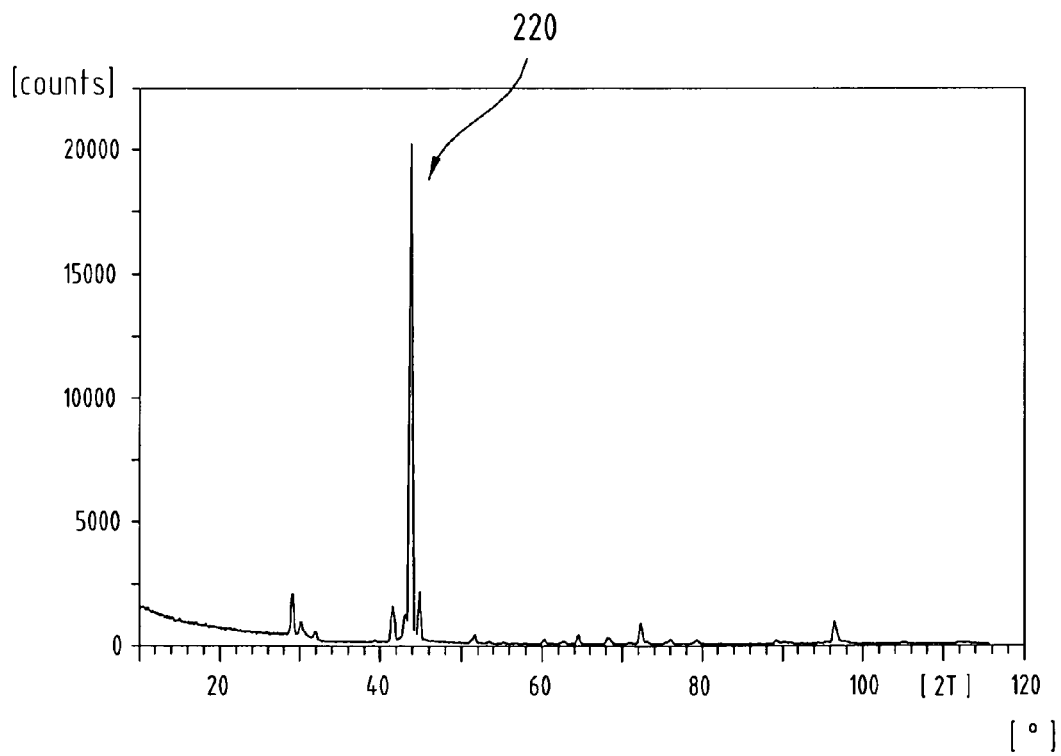
Figure 3:
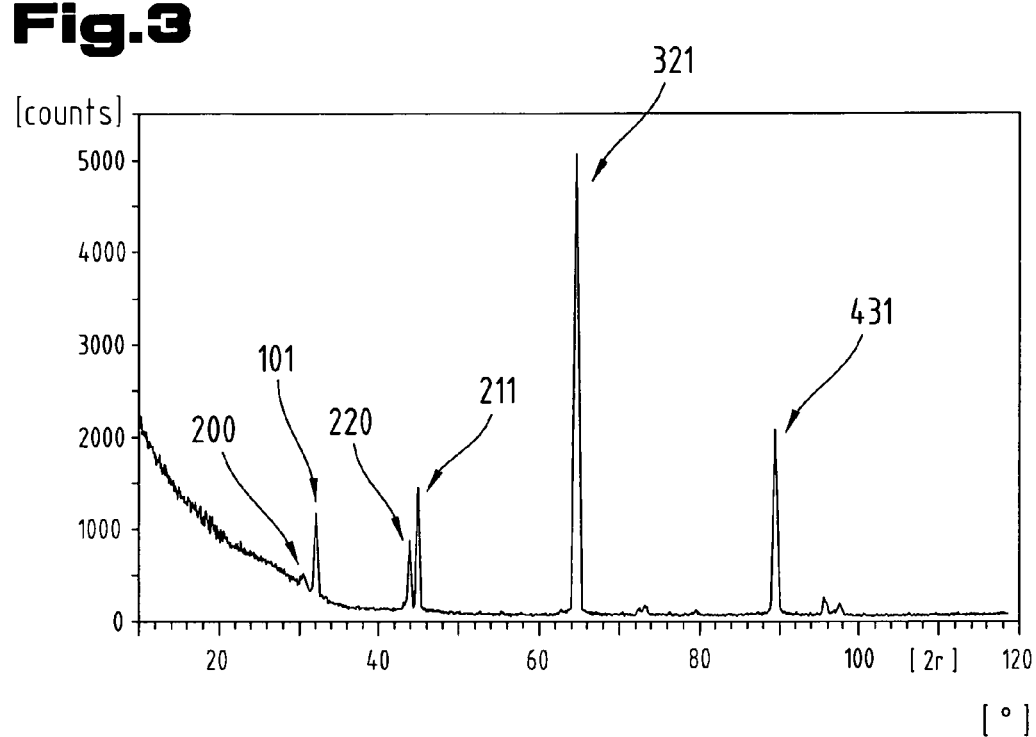
Figure 4:
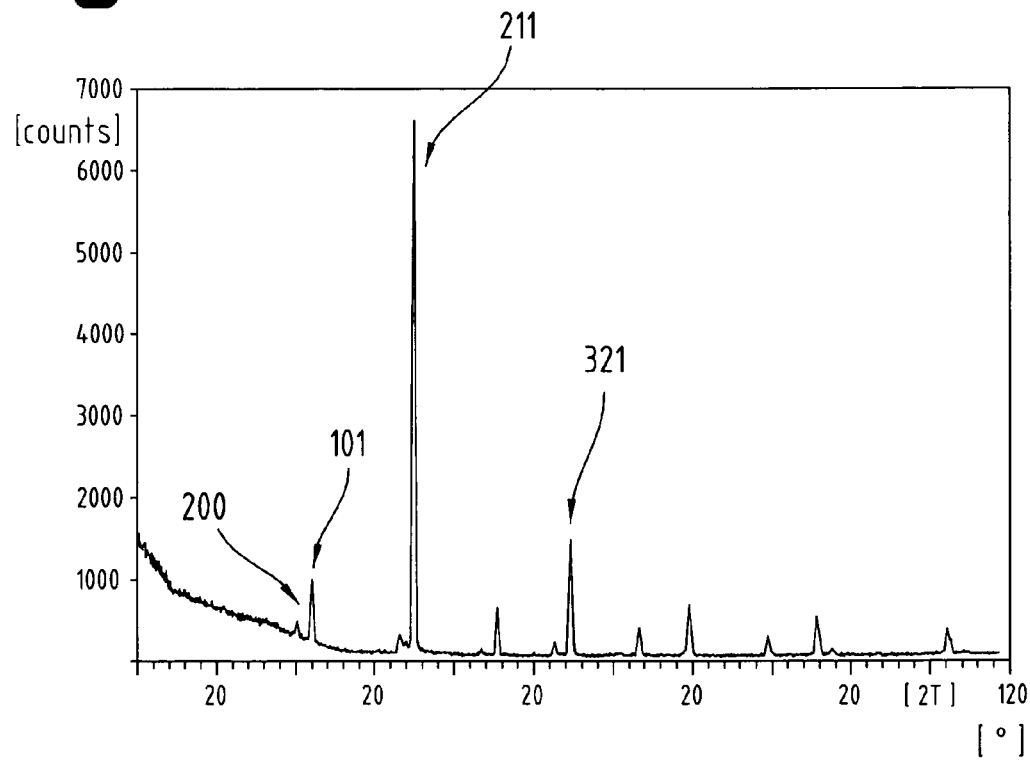
Figure 5:
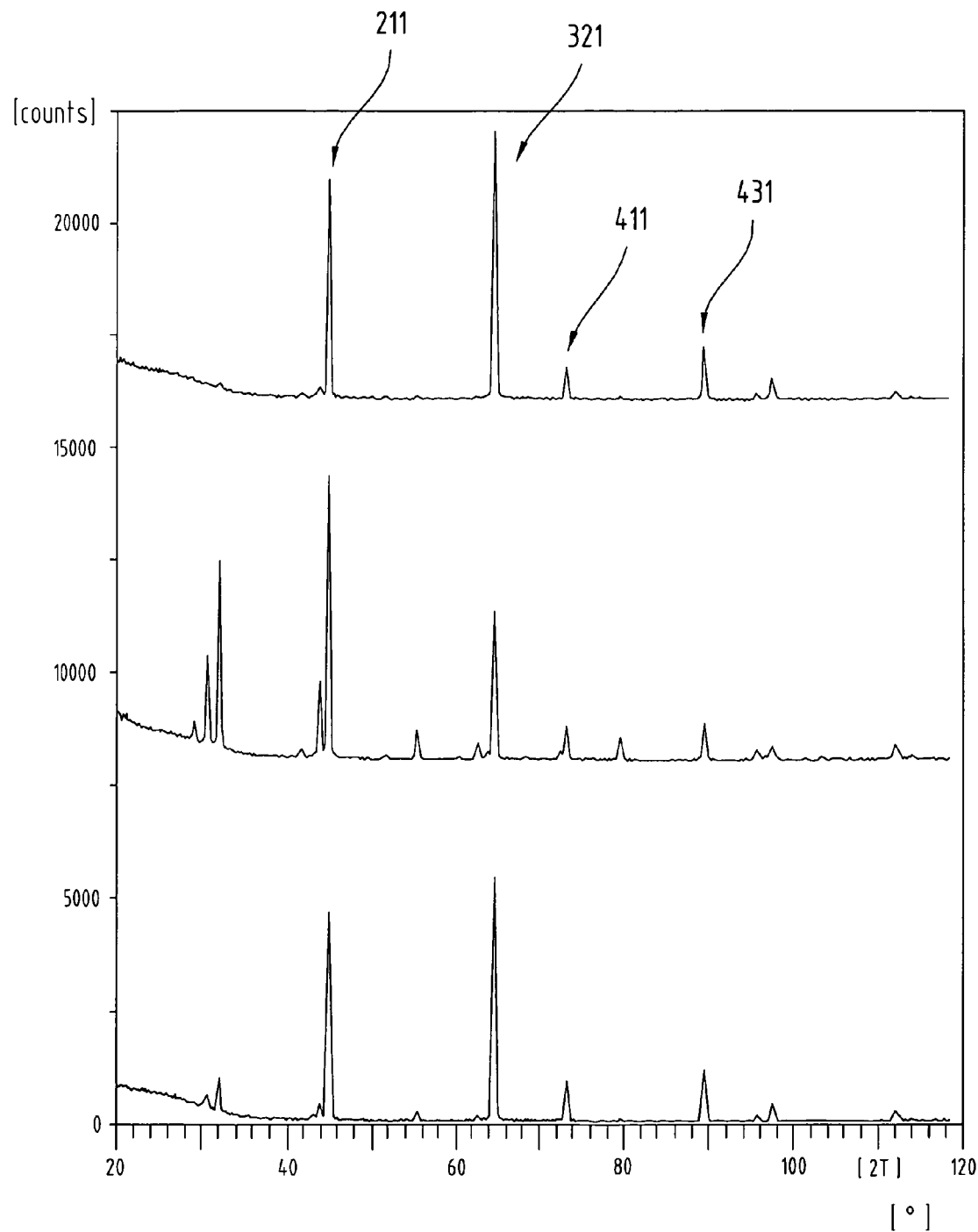
Figure 6:
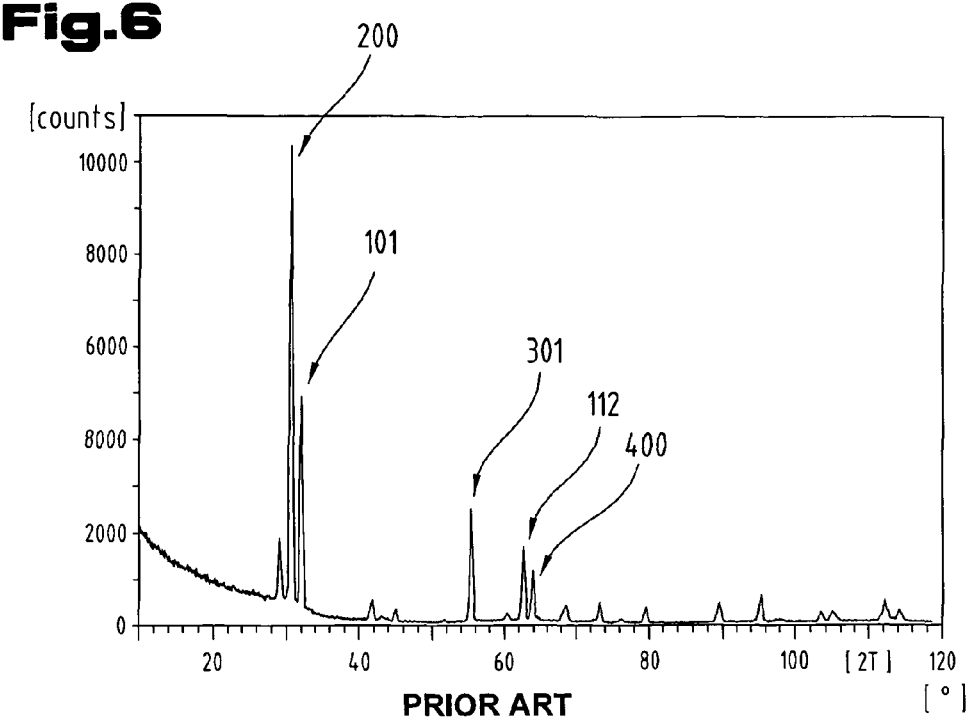
Figure 7:
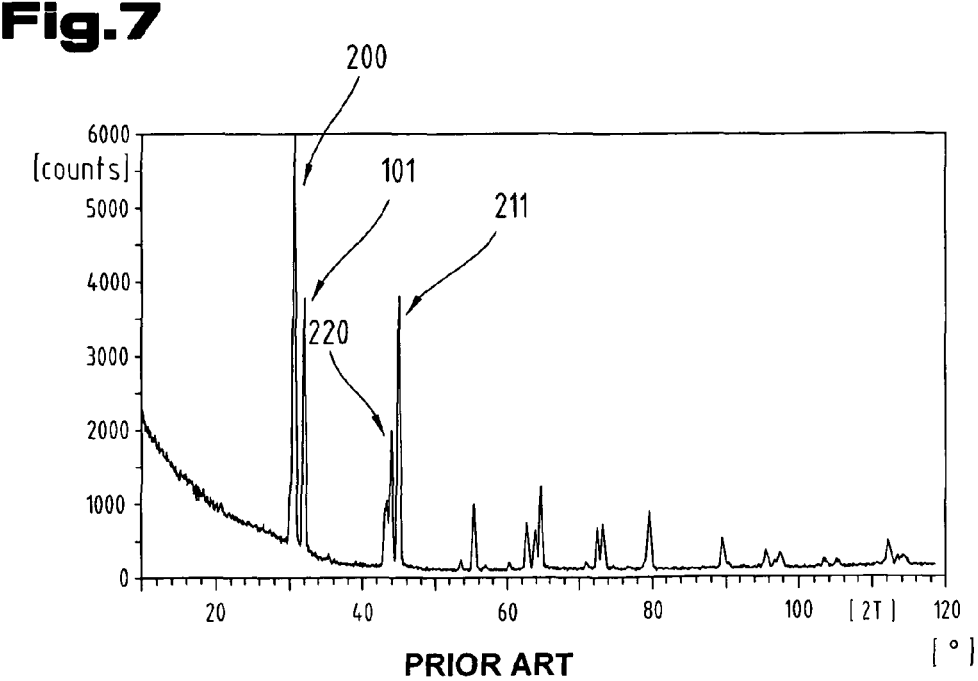

These are schematically simplified drawings illustrating the following:

FIG. 1 a multi-layered friction bearing in the form of a friction bearing half-shell;

FIG. 2 the X-ray diffraction pattern of the surface of an anti-friction coating proposed by the invention made from SnSb11Cu4Bi;

FIG. 3 the X-ray diffractogram of an anti-friction coating proposed by the invention made from SnSb7CuPb $ZrO_2$;

FIG. 4 the X-ray diffractogram of an anti-friction coating proposed by the invention made from SnCu3;

FIG. 5 X-ray diffractograms taken on a tested friction bearing with an anti-friction coating proposed by the invention made from SnSb8CuPb, taken from the top prior to testing, taken in the middle after testing, distorted due to the surface zone damaged by wear, underneath, having removed the damaged surface zone by ion etching;

FIG. 6 the X-ray diffractogram of an anti-friction coating known from the prior art and based on the composition SnSb7Cu1Pb;

FIG. 7 the X-ray diffractogram of an anti-friction coating known from the prior art and based on the composition SnCu6Pb1.

FIG. 1 shows a cross-section through a multi-layered friction bearing 1 in the form of a friction bearing shell. The variant illustrated is a three-layered variant of the multi-layered friction bearing 1, comprising a metal base layer 2, a bearing metal layer 3 and an anti-friction coating 4. The bearing metal layer 3 is disposed between the anti-friction coating 4 and the metal base layer 2.

The main structure of such a three-layered bearing, such as used in automotive vehicles for example, is known from the prior art. In a known manner, coatings may be applied, for example a coating to impart adhesion may be applied between the anti-friction coating 4 and the bearing metal layer 3 and/or a diffusion barrier coating, and an adhesive coating may likewise be provided between the bearing metal layer 3 and the metal base layer 2.

Within the context of the invention, the multi-layered friction bearing 1 may also be of a different design, for example a bearing bush, as indicated by broken lines in FIG. 1. Other possible embodiments include synchroniser rings, axially extending sliding blocks or similar.

Another possibility offered within the context of the invention is to dispense with the bearing metal layer 3, in which case the anti-friction coating 4 is applied to the metal base layer 2 either directly or with an adhesive applied in between and/or to apply a diffusion barrier coating to the metal base layer 2. Also within the scope of the invention, direct coatings may be applied, for example for connecting rod eyes, in which case the metal base layer 2 is not necessarily of a layered design.

The metal base layer 2 is usually made from steel or a material which imparts the requisite structural strength to the multi-layered friction bearing 1. Such materials are known from the prior art.

A range of different alloys may be used for the bearing metal layer 3 such as those used as standard for anti-friction bearing elements. Examples of these are:
1. bearing metals with an aluminium base (conforming to DIN ISO 4381 and 4383):
AlSn6CuNi, AlSn20Cu, AlSi4Cd, AlCd3CuNi, AlSi11Cu, AlSn6Cu, AlSn40, AlSn25CuMn, AlSi11CuMgNi, AlZn4Si.
2. bearing metals with a copper base (conforming to DIN ISO 4383):
CuSn10, CuAl10Fe5Ni5, CuZn31Si, CuPb24Sn2, CuSn8Bi10, CuSn4Zn.

Naturally, bearing metals other than those listed above may also be used.

As proposed by the invention, the anti-friction coating 4 is made from a tin-based alloy, containing at least one element from a group comprising antimony and copper, and optionally lead and/or bismuth. The proportion of antimony is at most 20% by weight, in particular between 5% by weight and 15% by weight, that of copper at most 10% by weight, in particular between 0.5% by weight and 5% by weight. The total proportion of lead and/or bismuth is at most 1.5% by weight, in particular between 0.2% by weight and 0.5% by weight. If both antimony and copper are used, the total proportion of these elements is at least 2% by weight, in particular between 2% by weight and 22% by weight. In order to obtain lead-free tin-based alloys as proposed by the invention, the lead content is restricted to at most 0.1% by weight, preferably at most 0.05% by weight.

In order to strengthen the tin matrix, another option is for the tin-based alloys at least to contain an element from a group comprising zirconium, silicon, zinc, nickel, and silver, in which case their proportion is limited to at most 3% by weight. In this respect, the zirconium and silicon may not necessarily be present as inter-metallic phases and instead may be in the form of $ZrO_2$ or SiC particles. In this case, it is of advantage if the mean diameter of these particles is limited to 0.01 µm to 1 µm, in particular 0.05 µm to 0.75 µm.

The coating thickness of the anti-friction coating 4 may be between 10 µm and 2000 µm. In this respect, coating thicknesses of between 500 µm and 2000 µm are used if a coating is applied directly to the metal base layer 1, whereas coating thicknesses of between 100 µm and 400 µm are preferably used if the anti-friction coating 4 is used as a replacement for cast white metals on bronze for example, and if using the anti-friction coating 4 as a running layer in bearings made from three materials, it is preferable to opt for coating thicknesses of between 15 µm and 40 µm.

As mentioned above, intermediate coatings may also be applied to the multi-layered friction bearing 1. These intermediate coatings may either comprise a single layer or be made up of several partial coatings. In particular, these intermediate coatings are made from an element from the group comprising chromium, nickel, iron, copper or tin, and mixed variants are also possible, for example it is possible to use intermediate coatings containing at least two of these elements, e.g. chromium and nickel or iron and tin. In the case of intermediate coatings made up of several partial coatings, the proportions in the individual partial coatings may be different, for example the content of hardening alloying elements, namely chromium, nickel, iron, copper may be applied starting from the outermost partial coating underneath the anti-friction coating 4 in the direction towards the bearing metal layer 3 or the metal base layer 2 may have a partial coating which increases towards the (respective) next partial coating, for example in the form of a gradient.

With a view to imparting adhesion, it has proved to be of advantage if a tin coating or a coating of a tin-based alloy is used as the intermediate coating for the multi-layered friction bearing 1 proposed by the invention.

Instead of the specified, preferably intermediate, coatings, it would also be possible to use other coatings known from the prior art.

The intermediate coating or the total of the partial coatings may have a coating thickness of between 0.5 µm and 10 µm, preferably 1 µm respectively 4 µm. It is of particular advantage if this intermediate coating as a whole or at least one of the partial coatings is three times harder than the anti-friction coating 4 and preferably harder than the base material. The anti-friction coating 4 may have a hardness based on Vickers of 10 to 50 for example, so that the intermediate coating or at least one of the partial coatings may have a hardness of HV 80 to HV 300. The level of test force will depend on the coating thickness of the coating to be measured in a manner known per se. Up to a coating thickness of 40 µm, a test force of between 1 Pond and 3 Pond and between 80 µm and 300 µm a test force of up to 10 Pond is used.

The anti-friction coating 4 is preferably galvanically produced. To this end, a bimetallic strip made from a steel protective layer and a bearing metal layer 3 is produced first of all and optionally re-shaped and/or processed by removing material. The anti-friction coating 4 proposed by the invention is deposited on the bearing metal layer 3, for example under the following conditions:

| Electrolyte and deposition parameters for SnSb6Cu with {hk1} orientation | |
|---|---|
| Sn | 35 g/l (as tin(II)tetrafluoroborate) |
| Sb | 3 g/l (as antimony trifluoride) |
| Cu | 0.5 g/l (as copper(II)tetrafluoroborate |
| Stabiliser(s) and base electrolyte(s), conductive salt(s) or complexing agents | |
| Oxidation inhibitor(s) Additives 1 and/or 2 | |
| Current density | 2 A/dm$^2$ |
| Temperature | 35° C. |
| Electrolyte and deposition parameters for SnSb11Cu4Bi with {220} orientation | |
| Sn | 50 g/l (as tin(II)tetrafluoroborate) |
| Sb | 6 g/l (as antimony trifluoride) |
| Cu | 4 g/l (as copper(II)tetrafluoroborate |
| Bi | 0.5 g/l (as bismuth(III)methane sulphonate) |
| Stabiliser(s) and base electrolyte(s), conductive salt(s) or complexing agents | |
| Oxidation inhibitor(s) Additives 1 and/or 2 | |
| Current density | 3 A/dm$^2$ |
| Temperature | 15° C. |

Tin may be used in the form of tin(II)tetrafluoroborate, tin(II)methane sulphonate, tin(II)sulphate, tin(II)pyrophosphate. Generally speaking, the concentration of tin in the electrolyte may be between 0.1 mol/l and 1 mol/l.

Antimony may be used in the form of antimony(III)tetrafluoroborate, antimony trifluoride, antimony(III)oxide, potassium antimony tartrate. Generally speaking, the concentration of antimony in the electrolyte may be up to 0.3 mol/l.

Copper may be used in the form of copper(II)tetrafluoroborate, copper(II)methane sulphonate, copper(II)sulphate, copper(II)pyrophosphate. Generally speaking, the concentration of copper in the electrolyte may be up to 0.3 mol/l.

Lead may be used in the form of lead(II)tetrafluoroborate, lead(II)methane sulphonate, lead(II)pyrophosphate, lead acetate. Generally speaking, the concentration of lead in the electrolyte may be up to 0.01 mol/l.

bismuth may be used in the form of bismuth trifluoride, bismuth(III) methane sulphonate, bismuth(III) sulphate, bismuth(III) pyrophosphate. Generally speaking, the concentration of bismuth in the electrolyte may be up to 0.01 mol/l.

Silver may be used in the form of silver tetrafluoroborate, silver methane sulphonate, silver pyrophosphate, silver sulphate. Generally speaking, the concentration of silver in the electrolyte may be up to 0.3 mol/l.

Zinc may be used in the form of zinc(II)tetrafluoroborate, zinc(II)methane sulphonate, zinc(II)sulphate, zinc(II)pyrophosphate. Generally speaking, the concentration of zinc in the electrolyte may be up to 0.3 mol/l.

Nickel may be used in the form of nickel(II)tetrafluoroborate, nickel(II)methane sulphonate, nickel(II)sulphate, nickel (II)pyrophosphate. Generally speaking, the concentration of nickel in the electrolyte may be up to 0.3 mol/l.

Possible stabilisers and base electrolytes, conductive salts or complexing agents are: tetrafluoro-boric acid, fluoride-based acid, methane sulphonic acid, tartaric acid and its alkali and ammonium salts, citric acid and its alkali and ammonium salts, ammonium and alkali pyrophosphates, phosphonic acid and its alkali and ammonium salts, 2.2-ethylene dithiodiethanol, phenol and kresol sulphonic acids, in a total concentration of between 0.2 mol/l and 2 mol/l.

Possible oxidation inhibitors are: resorcinol, hydroquinone, pyrocatechol, pyrogallol, formaldehyde, methanol, in a total concentration of between 0.03 mol/l and 0.3 mol/l.

Possible additives 1 are: phenol phthalein, thiourea and derivatives thereof, alpha or beta naphthol and ethoxylates thereof, alpha and beta naphthol sulphonic acid and ethoxylates thereof, o-toluidine, hydroxyquinoline, lignin sulphonate, butien diol, in a total concentration of between 0.0005 mol/l and 0.05 mol/l, preferably 0.002 mol/l and 0.02 mol/l.

Possible additives 2 are: gelatines, size, non-ionic surfactants, polyethylene glycol and their functionalised derivatives, peptone, glycine, in a total concentration of between 0 g/l-20 g/l.

It would also be possible to use mixtures of the elements of the electrolytes listed above, e.g. at least two salts of a or the respective metal and/or at least two stabilisers and/or at least two oxidation inhibitors and/or at least two additives 1 and/or at least two additives 2. Zirconium and silicon may be used in the form of $ZrO_2$ or SiC particles with the specified grain size dispersed in the bath.

Zinc, nickel, lead, bismuth, silver and other alloying elements may be added to an appropriate electrolyte in the form of the soluble compounds or complexes listed above and deposited from these. Another way of forming an alloy is by diffusing the elements into the coating or depositing them from particles suspended in the electrolyte.

The anti-friction coatings 4 produced in this manner have a pronounced beta-tin phase, in which inter-metallic phases are present with the individual ones of and/or between the other alloying element(s).

During tests conducted on the anti-friction coating 4, the following alloy compositions based on the invention were produced as examples in addition to those corresponding to the prior art. All figures relating to the compositions set out in Tables 1, 2 and 3 below should be read as based on % by weight. The remaining amount to make up 100% by weight is tin in each case.

The test results for the corresponding anti-friction coatings 4 are also set out in Tables 1, 2 and 3.

Tests were conducted on friction bearing shells of the type illustrated in FIG. 1 made from a steel base layer 2 and a lead bronze bearing metal layer 3 with an anti-friction coating 4 of 25-35 μm coating thickness. The tests on the bearing shells were conducted with a gradually changing load and a specific load amplitude of 60 MPa over 3 million load cycles at a sliding speed of 12 m/s.

After testing, the half-shells were measured and wear of the anti-friction coating 4 thus determined. The fatigue strength of the anti-friction coating 4 was visually assessed.

A mark of 1 to 5 for the visual evaluation covers the state of very good (1: running tracks) to very poor (5: pronounced permanent breaks over a large surface area).

Table 1 sets out the test results of those anti-friction coatings 4 whose diffractograms are shown by way of example in FIGS. 2-7. Also listed are the intensity readings taken from the diffractograms and the orientation indices calculated from these. Samples 1-4 (FIG. 2-FIG. 5) represent anti-friction coatings 4 based on the invention. Samples 5-6 (FIG. 6 and FIG. 7) represent anti-friction coatings 4 based on the prior art.

Table 2 sets out other results obtained with respect to the coatings proposed by the invention.

Table 3 sets out other results obtained with respect to the coatings based on the prior art, produced to enable a comparison.

TABLE 1

| No[1] | FIG. | {200} | {101} | {220} | {211} | {301} | {112} | {400} | {321} | {420} | {411} | {312} | {431} | Σ |
|---|---|---|---|---|---|---|---|---|---|---|---|---|---|---|
| Sn[2] | 2 | 100 | 90 | 34 | 74 | 17 | 23 | 13 | 20 | 15 | 15 | 20 | 13 | 434.0 |
| 1 | | 2.7 | 1.6 | 100 | 10.3 | 0.3 | 0.5 | 0 | 2 | 3.9 | 0.4 | 0.8 | 0.7 | 123.2 |
| 2 | 3 | 2.3 | 17.7 | 14.8 | 26.2 | 0.4 | 0.7 | 0 | 100 | 1.3 | 1.8 | 1 | 40.7 | 206.9 |
| 3 | 4 | 2.8 | 11 | 2 | 100 | 8.7 | 2.3 | 0 | 21.5 | 0 | 4.8 | 7.9 | 3.4 | 164.4 |
| 4 | 5 Top | 0 | 1.7 | 3.1 | 81.7 | 0.8 | 0 | 0 | 100 | 0 | 12.2 | 0.6 | 18.9 | 219 |
| 4 | 5 Middle | 30 | 65.5 | 27.1 | 100 | 9.7 | 5.7 | 2.3 | 51.8 | 2.7 | 11.3 | 6.9 | 12.9 | 325.9 |
| 4 | 5 Bottom | 5.5 | 12.7 | 5.5 | 82.6 | 3.9 | 1.9 | 0 | 100 | 0 | 16.3 | 0.9 | 20.3 | 249.6 |
| 5 | 6 | 100 | 45.8 | 0.8 | 2.6 | 22.8 | 15.8 | 0 | 10.8 | 0 | 4.4 | 2.6 | 3.7 | 209.3 |
| 6 | 7 | 100 | 61 | 31.1 | 65 | 2.1 | 11 | 9.6 | 20 | 10.1 | 10.8 | 13.2 | 6.4 | 340.3 |

| No.[1] | {200} | {101} | {220} | {211} | {301} | {112} | {400} | {321} | {420} | {411} | {312} | {431} |
|---|---|---|---|---|---|---|---|---|---|---|---|---|
| Sn[2] | 1.0 | 1.0 | 1.0 | 1.0 | 1.0 | 1.0 | 1.0 | 1.0 | 1.0 | 1.0 | 1.0 | 1.0 |
| 1 | 0.1 | 0.1 | 10.4 | 0.5 | 0.1 | 0.1 | 0.0 | 0.4 | 0.9 | 0.1 | 0.1 | 0.2 |
| 2 | 0.0 | 0.4 | 0.9 | 0.7 | 0.0 | 0.1 | 0.0 | 10.5 | 0.2 | 0.3 | 0.1 | 6.6 |
| 3 | 0.1 | 0.3 | 0.2 | 3.6 | 1.4 | 0.3 | 0.0 | 2.8 | 0.0 | 0.8 | 1.0 | 0.7 |
| 4 | 0.0 | 0.0 | 0.2 | 2.2 | 0.1 | 0.0 | 0.0 | 9.9 | 0.0 | 1.6 | 0.1 | 2.9 |
| 4 | 0.4 | 1.0 | 1.1 | 1.8 | 0.8 | 0.3 | 0.2 | 3.4 | 0.2 | 1.0 | 0.5 | 1.3 |
| 4 | 0.1 | 0.2 | 0.3 | 1.9 | 0.4 | 0.1 | 0.0 | 8.7 | 0.0 | 1.9 | 0.1 | 2.7 |
| 5 | 2.1 | 1.1 | 0.0 | 0.1 | 2.8 | 1.4 | 0.0 | 1.1 | 0.0 | 0.6 | 0.3 | 0.6 |
| 6 | 1.3 | 0.9 | 1.2 | 1.1 | 0.2 | 0.6 | 0.9 | 1.3 | 0.9 | 0.9 | 0.8 | 0.6 |

| No. | Sn | Sb | Cu | Pb | Bi | Other | Visual evaluation | Wear [μm] |
|---|---|---|---|---|---|---|---|---|
| 1 | Rem. | 11 | 4.0 | 0 | 0.4 | | 2.0 | 2 |
| 2 | Rem. | 6 | 0.5 | 0.2 | | ZrO2: 0.9% | 1.5 | 4 |
| 3 | Rem. | 0 | 3.0 | 0.03 | | | 3.0 | 3 |
| 4 | Rem. | 8 | 0.4 | 0.3 | | | 2.0 | 3 |
| 5 | Rem. | 7 | 1.0 | 0.7 | | | 4.0 | 10 |
| 6 | Rem. | 0 | 6.0 | 1.1 | | | 5.0 | 8 |

[1] Sample number
[2] Powder (ICDD PDF 00-004-0673)
[1] Sample number
[2] Powder (ICDD PDF 00-004-0673)

TABLE 2

Anti-friction coatings based on the invention

| Ex. | Sb | Cu | Pb | Other | Orientation index M{hkl} | Visual evaluation | Wear [μm] |
|---|---|---|---|---|---|---|---|
| 1 | 11 | 4 | 0.3 | | M{101} = 3.3 | 2.0 | 2 |
| 2 | 7 | 0.7 | 0.5 | | M{220} = 7.5 | 2.5 | 3 |
| 3 | 6 | 0.3 | 0.3 | Bi: 0.1 | M{301} = 6.7 | 2.0 | 4 |
| 4 | | 2 | 0.3 | Zn: 1 | M{211} = 6.3 | 2.0 | 6 |
| 5 | | 3 | <0.05 | Ni: 0.2 | M{211} = 4.8 M{321} = 3.1 | 2.0 | 4 |
| 6 | | 4 | <0.05 | Bi: 0.25 | M{321} = 9.7 M{431} = 7.5 | 2.0 | 2 |
| 7 | | 5 | 0.4 | | M{101} = 3.1 M{211} = 3.3 M{112} = 3.0 | 2.0 | 2 |
| 8 | | 10 | 0.9 | ZrO2: 1.5 | M{220} = 11.3 | 3.0 | 2 |
| 9 | 3 | | 1 | SiC: 0.3 | M{211} = 8.3 | 1.5 | 4 |
| 10 | 5 | 0.6 | 0.2 | ZrO2: 0.4 | M{321} = 12.3 | 1.5 | 3 |
| 11 | 7 | 3.5 | <0.05 | | M{431} = 6.3 | 2.0 | 4 |
| 12 | 9 | 1 | <0.05 | Bi: 0.3 Zn: 0.3 | M{411} = 4.1 | 2.5 | 3 |
| 13 | 10 | 3 | 0.8 | | M{301} = 3.6 | 3.0 | 3 |
| 14 | 11 | 1.3 | 0.2 | Ag: 0.8 | M{220} = 7.9 | 2.5 | 4 |
| 15 | 13 | 5 | 0.4 | | M{321} = 5.9 | 1.5 | 2 |
| 16 | 15 | 3 | <0.05 | | M{211} = 4.3 | 3.0 | 3 |

TABLE 3

Anti-friction coatings based on the prior art

| Ex. | Sb | Cu | Pb | Other | Maximum orientation index M{hkl} | Visual evaluation | Wear [μm] |
|---|---|---|---|---|---|---|---|
| I | 6 | 1 | 1 | | M{220} = 2.9 | 3.5 | 7 |
| II | 5 | 0.6 | 0.2 | ZrO2: 0.4 | M{220} = 1.5 | 2.5 | 4 |
| III | | 6 | | Zn: 0.8 | M{200} = 1.8 | 4.0 | 5 |
| IV | | 2 | | | M{101} = 2.3 | 3.5 | 8 |
| V | | 3 | 0.3 | Ni: 0.5 | M{321} = 1.9 | 3.0 | 7 |
| VI | | 6 | <0.05 | | M{321} = 1.3 | 4.0 | 6 |
| VII | 5 | 0.5 | <0.05 | | M{200} = 2.5 | 3.5 | 9 |
| VIII | 10 | 4 | 0.4 | | M{220} = 2.8 | 4.0 | 4 |
| IX | 15 | 2 | 0.1 | | M{211} = 1.7 | 5.0 | 12 |
| X | | 5 | | Ag: 2 | M{431} = 2.2 | 3.5 | 3 |
| XI | 8 | 2 | | Bi: 0.5 | M{112} = 2.4 | 4.0 | 5 |

It is clear that compared with the examples based on the prior art, the anti-friction coatings 4 based on the invention exhibited better values for wear and fatigue strength, particularly in a direct comparison of coatings of the same or similar chemical compositions.

From all the compiled test results, not all of which could be reproduced here, it was found that advantageous anti-friction coatings 4 were obtained in terms of resistance to wear and tendency to seize if the beta-tin grains have at least one pronounced degree of orientation. The expression at least one within the meaning of the invention should be construed as meaning that it would also be possible for the beta-tin grains to have a preferred orientation in one or more other directions in addition to the main orientation.

As mentioned above, in the case of samples which have already been run on a test stand or were processed during manufacture after depositing the anti-friction coating 4, e.g. precision boring, problems occur with regard to X-ray diffractometry due to the short penetration depth of the X-rays insofar as the actual structure of the anti-friction coating 4, which was not affected by these finishing treatments, could not be assessed in full until after an initial treatment. These same problems also occur if a so-called tin flash is applied to the surface of the anti-friction coating 4. In other words, the measurement results are very much influenced by the surface treatment of the anti-friction coating, namely if the sample is not pre-treated, it is not the sample itself that is measured but deposits on the surface. The surface of the sample to be tested must therefore be pre-treated or "exposed".

The effect of this surface problem on the measurement results is set out in FIG. 5, and ion etching was selected as the pre-treatment. Accordingly, the surface of the substrate is bombarded with ions in a known manner, similar to a sputtering process.

FIG. 5 shows the uppermost diffractogram of a surface of an anti-friction coating 4 made from SnSb6CuPb, such as applied to a friction bearing half-shell, in the undamaged state. The middle diffractogram in FIG. 5 was taken from the surface of the same half-shell after it had been subjected to the test described above. The measurement result was significantly affected by the slight wear which occurred during testing.

The lowermost diffractogram in FIG. 5 was again taken on the surface of the same half-shell after testing and removing the damaged zone. In order to remove the damaged zone, the surface was ion etched 10 times for 2 minutes in each case in the argon plasma at 6 kV, and the ion beam was directed onto the surface at an angle of 45°, with a pause of 5 minutes between etchings in each case in order to prevent the sample from overheating and melting.

The effect of the pre-treatment is clear to see from the comparison of the diffractograms, namely the intensity of individual peaks which do not originate from the oriented beta-tin grains becomes significantly weaker due to the adequate ion etching.

It is assumed that a further improvement to the tribological properties of the anti-friction coating 4 can be achieved if the beta-tin grains have a minimum grain size The embodiments illustrated as examples represent possible variants of the anti-friction coating 4 and the multi-layered friction bearing 1 but it should be pointed out at this stage that the invention is not restricted to the variants specifically illustrated here. Above all, the compositions set out in Table 1 for anti-friction coatings 4 each constitute the subject matter of independent inventions in each case.

LIST OF REFERENCE NUMBERS

1 Multi-layered friction bearing
2 Metal base layer
3 Bearing metal layer
4 Anti-friction coating

The invention claimed is:

1. A multi-layered friction bearing comprising at least one metal base layer, an anti-friction coating and optionally a bearing metal layer disposed between the anti-friction coating and the metal base layer,
    wherein the anti-friction coating consists of a tin-based alloy which, in addition to tin, consists of at least one element from the group consisting of antimony and copper as the main alloying element, optionally lead and/or bismuth, and unavoidable impurities originating from the elements during the manufacturing process, and the proportion of antimony is at most 20% by weight, the proportion of copper is at most 10% by weight and the total proportion of lead and bismuth is at most 1.5% by weight and the total proportion of copper and antimony is between 2% by weight and 22% by weight, and tin is present in the form of inter-metallic phases and as a tin phase with beta-tin grains,
    wherein the beta-tin grains in the tin-based alloy have at least a main orientation and an orientation index M{hkl} based on the formula $$M\{hkl\} = \frac{I\{hkl\} \sum I^0\{hkl\}}{I^0\{hkl\} \sum I[hkl]}$$

of at least one set of network levels M{hkl} having or exceeding the value 3.0, and I{hkl} stands for the X-ray diffraction intensities for the {hkl} planes of the anti-friction coating and I⁰{hkl} stands for the X-ray diffraction intensities of a totally non-oriented tin powder sample; and
    wherein the main orientation of the beta-tin grains the beta-tin grains are oriented along at least one of the planes {hk1} according to the Miller Index, and h is greater than k by 1 and h assumes a value of at most 4; or
    wherein the main orientation of the beta-tin grains the beta-tin grains are oriented along {220} to a degree of more than 30% according to the Miller Index, expressed by the surface underneath the peak created by this orientation of the beta-tin grains.

2. The multi-layered friction bearing as claimed in claim 1, wherein the surface underneath the peak created by beta-tin grains which are oriented along {321} according to the Miller Index is at least 1.2 times bigger than the surface underneath the peak created by beta-tin grains oriented along {431} according to the Miller Index.

3. The multi-layered friction bearing as claimed in claim 1, wherein the proportion of antimony is between 5% by weight and 15% by weight.

4. The multi-layered friction bearing as claimed in claim 1, wherein the copper content is between 0.5% by weight and 5% by weight.

5. The multi-layered friction bearing as claimed in claim 1, wherein at least one of lead and bismuth is present in the tin-based alloy and the total proportion of lead and bismuth is between 0.2% by weight and 0.5% by weight.

6. The multi-layered friction bearing as claimed in claim 1, wherein the lead content is at most 0.1% by weight.

7. The multi-layered friction bearing as claimed in claim 1, wherein an intermediate layer is disposed between the bearing metal layer and the anti-friction coating which is made up of one or more partial layers galvanically deposited or formed by diffusion, and each of the partial layers contains one or more elements selected from the group consisting of chromium, nickel, iron, cobalt, copper and tin.

8. The multi-layered friction bearing as claimed in claim 7, wherein the intermediate layer has a hardness which is at least three times greater than the hardness of the anti-friction coating and is also greater than the hardness of the base material.

9. A multi-layered friction bearing comprising at least one metal base layer, an anti-friction coating and optionally a bearing metal layer disposed between the anti-friction coating and the metal base layer,
   wherein the anti-friction coating consists of a tin-based alloy which, in addition to tin, consists of at least one element from the group consisting of antimony and copper as the main alloying element, at least one element selected from a group consisting of zirconium, silicon, zinc, nickel and silver in a proportion of at most 3% by weight in total, optionally lead and/or bismuth, and unavoidable impurities originating from the elements during the manufacturing process, and the proportion of antimony is at most 20% by weight, the proportion of copper is at most 10% by weight and the total proportion of lead and bismuth is at most 1.5% by weight and the total proportion of copper and antimony is between 2% by weight and 22% by weight, and tin is present in the form of inter-metallic phases and as a tin phase with beta-tin grains,
   wherein the beta-tin grains in the tin-based alloy have at have at least a main orientation and an orientation index $M\{hkl\}$ based on the formula $$M\{hkl\} = \frac{I\{hkl\}\sum I^0\{hkl\}}{I^0\{hkl\}\sum I\{hkl\}}$$

of at least one set of network levels $M\{hkl\}$ having or exceeding the value 3.0, and $I\{hkl\}$ stands for the X-ray diffraction intensities for the $\{hkl\}$ planes of the anti-friction coating and $I^0\{hkl\}$ stands for the X-ray diffraction intensities of a totally non-oriented tin powder sample; and
   wherein the main orientation of the beta-tin grains the beta-tin grains are oriented along at least one of the planes $\{hkl\}$ according to the Miller Index, and h is greater than k by 1 and h assumes a value of at most 4, or
   wherein the main orientation of the beta-tin grains the beta-tin grains are oriented along $\{220\}$ to a degree of more than 30% according to the Miller Index, expressed by the surface underneath the peak created by this orientation of the beta-tin grains.

* * * * *

UNITED STATES PATENT AND TRADEMARK OFFICE
CERTIFICATE OF CORRECTION

PATENT NO. : 9,074,627 B2  
APPLICATION NO. : 12/928358  
DATED : July 7, 2015  
INVENTOR(S) : Zidar Page 1 of 1

It is certified that error appears in the above-identified patent and that said Letters Patent is hereby corrected as shown below:

In the claims,

Column 12, line 34 after "wherein", please insert: -- as --.

Column 12, line 38 after "wherein", please insert: -- as --.

Column 14, line 1 after the word "alloy", please delete: "have at".

Column 14, line 15 after "wherein", please insert: -- as --.

Column 14, line 19 after "wherein", please insert: -- as --.

Signed and Sealed this  
Third Day of November, 2015

Michelle K. Lee  
*Director of the United States Patent and Trademark Office*